Oct. 15, 1963
H. L. JARMAN
3,106,750
EXPANSIBLE TRAILER
Filed July 11, 1960
3 Sheets-Sheet 1
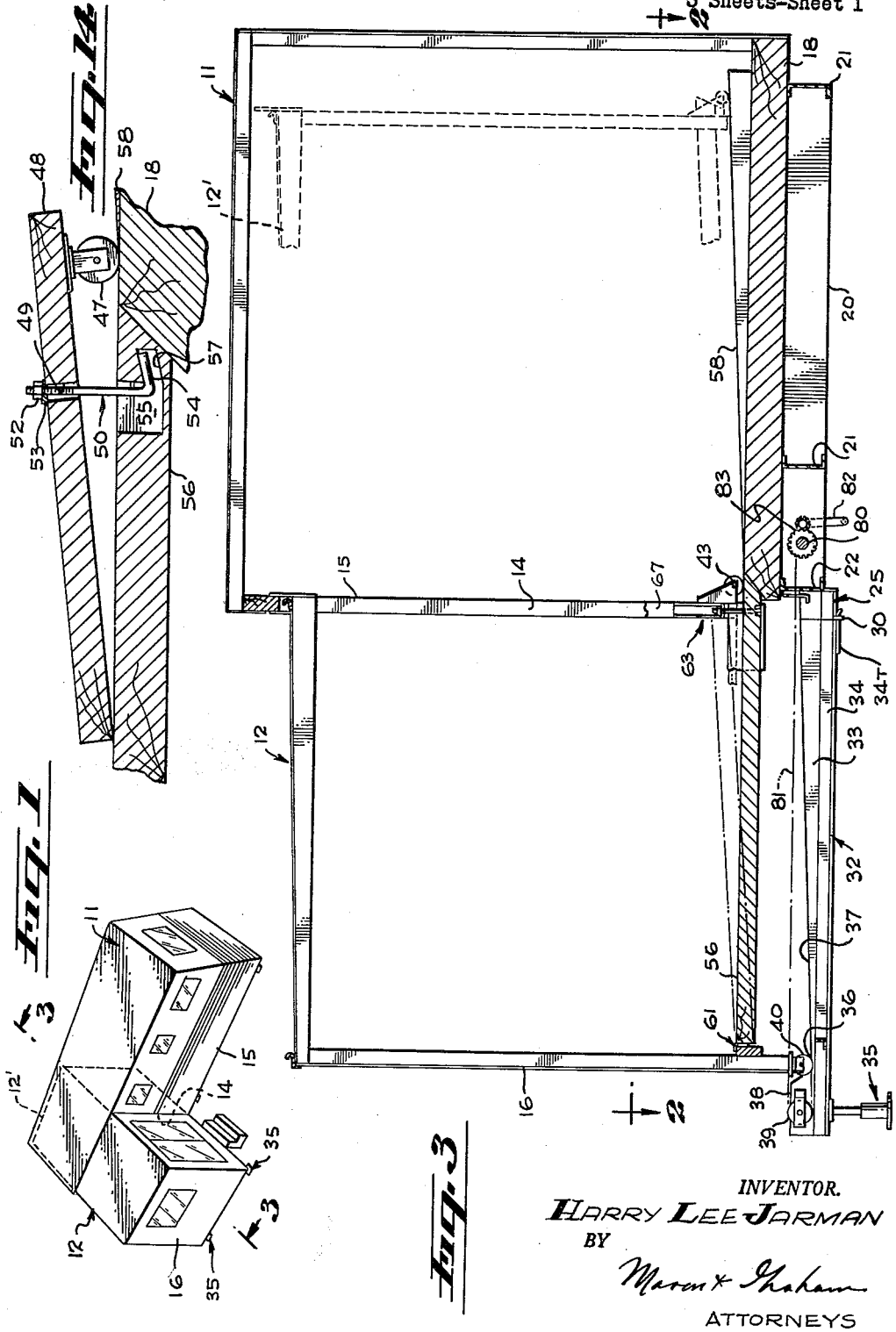
INVENTOR.
*Harry Lee Jarman*
BY
*Marvin & Graham*
ATTORNEYS

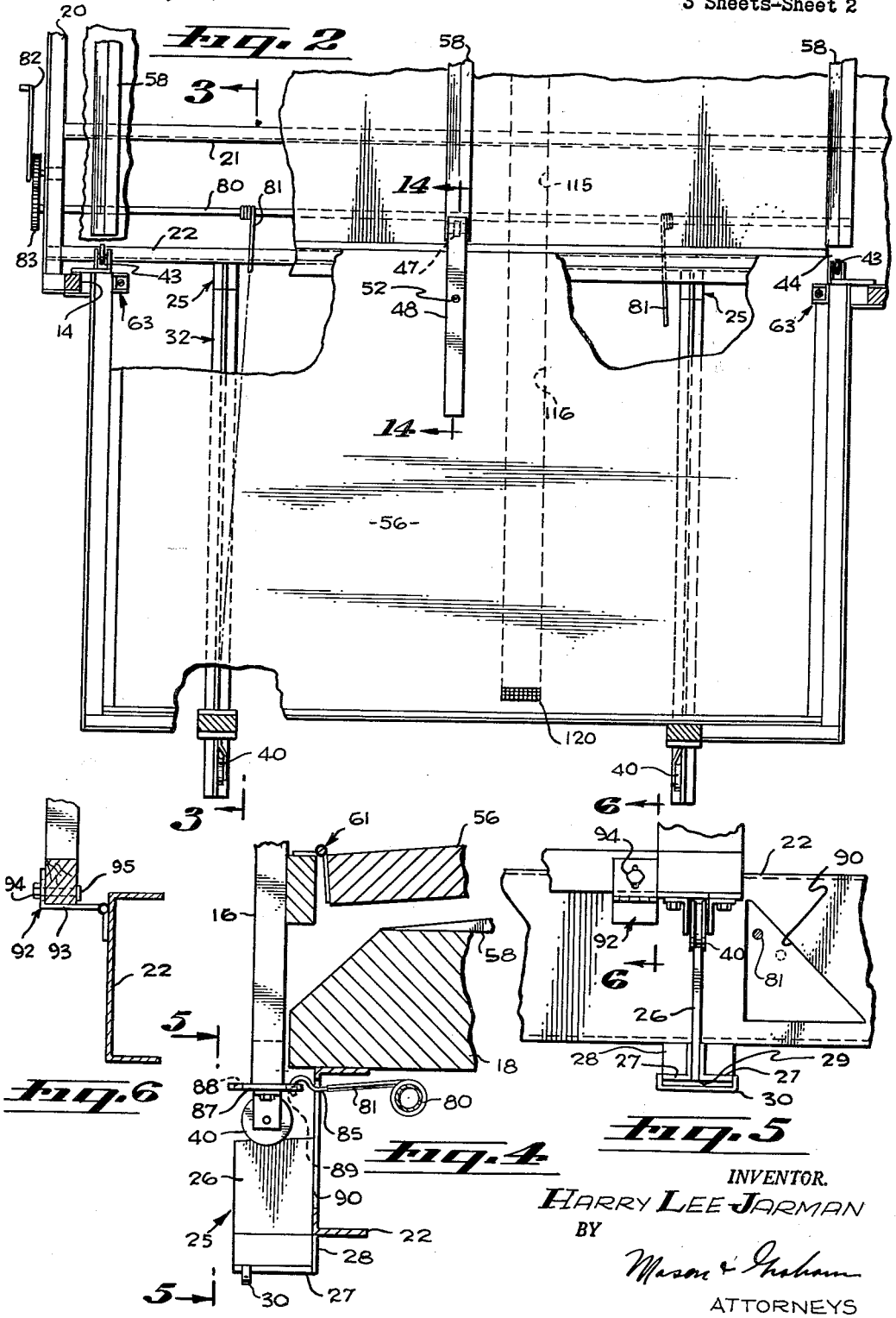

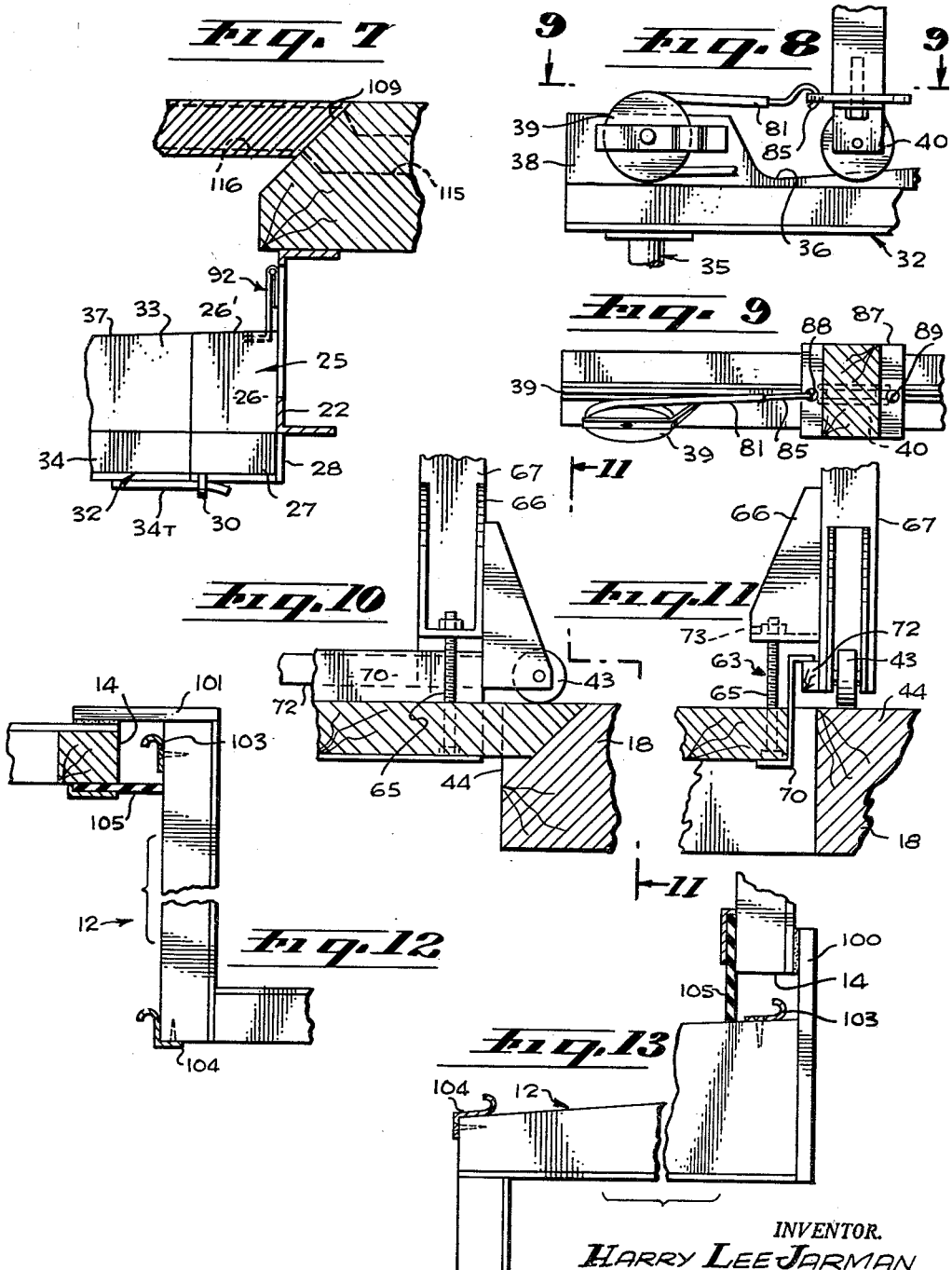

United States Patent Office 3,106,750
Patented Oct. 15, 1963

3,106,750
EXPANSIBLE TRAILER
Harry Lee Jarman, Anaheim, Calif., assignor of one-third to Vloden N. Cardner, Fullerton, Calif.
Filed July 11, 1960, Ser. No. 42,090
8 Claims. (Cl. 20—2)

This invention has to do generally with house trailers and particularly such house trailers as are adapted to be expanded to provide more living space when they are not in transit.

An object of the invention is to provide an improved house trailer or the like having a novel extensible and retractable telescoping room section.

A particular object is to provide an expansible trailer having a novel construction whereby the telescoped section of the trailer, when extended, provides a floor which is at the same level as the portion of the trailer which houses it when it is telescoped or retracted.

A further object is to provide novel means for supporting a telescoping section of a trailer as the same is moved in and out of telescoping position. In this connection it is an object to provide a novel arrangement of exterior track means and interior ramp means for supporting a telescoping section of a trailer.

A further object of the invention is to provide a novel construction wherein the telescoping section of the trailer travels an inclined path in moving in and out of telescoped position and, in this connection to provide novel removable ramp means within the main section of the trailer for supporting the telescoping section except when the same is fully extended.

Another object is to provide a novel hinged floor construction.

Still another object is to provide novel means for providing a weather seal around the edges of the telescoping section irrespective of whether the section is extended or retracted.

A further object is to provide a construction of the type indicated wherein the telescoping section of the trailer can be easily extended and retracted by a single person. These and other objects will be apparent from the drawings and the following description. Referring to the drawings:

FIG. 1 is a perspective view showing a trailer embodying the invention with the telescoping section extended;

FIG. 2 is an enlarged fragmentary sectional plan view of the telescoping section of the trailer extended and a portion of the main body of the trailer, the view being substantially on line 2—2 of FIG. 3;

FIG. 3 is a fragmentary sectional view on line 3—3 of FIGS. 1 and 2;

FIG. 4 is an enlarged sectional view in the same plane as FIG. 3 showing a portion of the outer corner of the telescoping part of the trailer with the parts telescoped;

FIG. 5 is a sectional view on line 5—5 of FIG. 4;

FIG. 6 is an enlarged sectional view on line 6—6 of FIG. 5;

FIG. 7 is an enlarged fragmentary sectional view on line 7—7 of FIG. 2;

FIG. 8 is an enlarged detail elevational view showing the outer end of an exterior track member and the outer corner of the telescoping section of the trailer;

FIG. 9 is a sectional view on line 9—9 of FIG. 8;

FIG. 10 is a fragmentary elevational view of one inner corner of the telescoping section showing the means for raising the floor;

FIG. 11 is a sectional view on line 11—11 of FIG. 10;

FIG. 12 is a fragmentary enlarged sectional plan view showing the joint between the outer wall of the trailer and the main section of the trailer;

FIG. 13 is a fragmentary sectional view showing the joint between the main section of the trailer and the upper wall of the telescoping section; and FIG. 14 is a fragmentary sectional view on line 14—14 of FIG. 2.

More particularly describing the invention, numeral 11 designates the main section of a house trailer and numeral 12 designates a telescoping section. In FIG. 1 the section 12 of the trailer is shown extended to provide additional living space when the trailer is parked. The broken lines designated 12' indicate the position that the telescoping section 12 occupies when it is retracted or telescoped into the main section for the purpose of reducing the over-all size of the trailer for towing over the highways.

In the drawings no attempt has been made to illustrate the construction of the walls of the trailer where the construction may be of any conventional type and therefore the drawings are somewhat skeletonized.

Referring particularly now to FIGS. 2 and 3 it will be seen that the main section or body of the trailer 11 is provided with an opening designated 14 in its side wall 15. This opening might be located at some other region of the main section than where shown. Section 12 is adapted to be moved in and out through the opening 14 and when the parts are telescoped the opening is closed by the outer wall 16 of the telescoping section. The main section 11 is shown as having a floor 18 which is supported upon a frame 20 including two longitudinal channels 21 and an auxiliary channel 22. The latter is provided with a pair of outwardly projecting spaced stub track elements 25. Each of these includes a short, vertically disposed plate 26 and a base formed of two angle pieces 27 and a back plate 28, the parts being welded together and to channel 22. Beneath the base and adjacent the outer edge of the stub track 25 I provide a slot 29 defined by a rod 30 secured to the base. The outer wall of the telescoping section 12 is supported upon the stub track 25 when the parts of the trailer are telescoped, however, when the section 12 is extended it is supported upon two track sections 32 which are attached to the stub tracks 25, all as will hereinafter appear.

The track sections 32 are each shaped in cross section like the stub tracks and include an upright plate 33 and a base formed of two angle sections 34. The inner end of the base is provided with a tongue 34T which is received in the slot 29 of one of the stub track sections. The outer end of each track 32 is supported upon a vertically adjustable post or jack 35 which rests upon the ground or upon a suitable foundation.

Each track 32 has an inclined upper surface 37 which rises from a low point at 36 to a high point at its inner end which forms a continuation of the inclined upper surface 26' of the stub track. The outer end of the track terminates in an elevated portion 38 which carries a sheave or pulley 39. The latter is inclined laterally as best shown in FIG. 9 so as to bring its upper portion more nearly in the plane of the upper surface 37 of the track.

Section 12 of the trailer is provided with a wheel 40 at each outer corner, the wheels being grooved to ride upon the two track members 32. At each inner corner section 12 of the trailer is provided with a wheel 43 which rests upon a portion 44 of the floor 18 of the main section of the trailer when the telescoping section is extended. The section 12 may also be provided with a removable third wheel, designated 47, intermediate the wheels 43. Wheel 47 (FIG. 14) is mounted upon a beam 48 of any desired length. The beam is apertured at 49 to receive a hook 50 having a threaded shank provided with a nut 52 and washer 53. The hooked end 54 is received in a slot 55 in the floor 56 of section 12, the slot having an offset recess 57. Beam 48 is removed when section 12 is being used. When it is desired to telescope the sections 11 and 12, the beam is hooked in place as shown, after which nut 52 is tightened to raise the floor so that it is supported at the center on the wheel 47.

Wheels 43 and 47 are designed to run upon removable ramps 58 which are placed upon the floor of the main section 11 of the trailer for this purpose. Each of these ramps is inclined at the same angle as the angle of inclination of the tracks 32. Thus when the section 12 is moved in and out of the main section of the trailer the entire section rises gradually from its extended position as it enters the main section to an elevated position therein. In order to allow this to happen, the floor 56 of section 12 of the trailer is hinged at 61 along or adjacent the outer wall 16 of section 12. At the two inner corners floor 56 is supported upon a jack means designated generally by numeral 63. In each case this comprises a bolt 65 which is suspended by a bracket 66 carried on the post 67 at the corner of the telescoping section. A Z-channel, designated 70, runs substantially the entire length of the floor, forming a part thereof, and normally supports the floor upon a rail 72 upon the side wall of the extensible section of the trailer. The bolt extends through the floor at the corner and serves as a jack whereby by tightening the nut 73 thereon the floor may be inclined sufficiently to permit it and channel 70 to clear the floor of the main section of the trailer when the section 12 is telescoped. The floor is supported at the center on wheel 47 as previously described.

For the purpose of extending and retracting section 12 of the trailer I provide a shaft 80 which is journaled in the frame of the main portion of the trailer and cables 81 which are attached at their inner ends to the shaft. The shaft is rotated by means of a crank 82 and intermediate gearing 83. The outer ends of the cables are provided with hooks 85 adapted to be connected selectively to either the inner or outer side of the outer wall of the telescoping section 12 and for this purpose each outer corner of section 12 is provided with a plate 87 having holes 88 and 89. When it is desired to extend the trailer section 12, the outer ends of the cables are passed around the sheaves 39 at the ends of the tracks 32 and the hooks secured in the holes 88. The section can then be drawn out by rotation of the crank 82 in the proper direction. Holes 90 provided in the channel 22 of the frame pass the cables. When it is desired to retract or telescope the section 12 of the trailer, the outer ends of the cables are hooked through holes 89 on the inner side of the outer wall and the cables reeled in on shaft 80.

For the purpose of locking the section 12 of the trailer in telescoped position, I provide two hinge plates 92 which are mounted on channel section 22 and these include an L-shaped portion 93 which, when raised as shown in FIG. 6 can be bolted to the outer wall of the section by means of a bolt 94 and nut 95.

Another feature of the invention is the provision of a weatherproof joint around the opening 14 in the main section 11 of the trailer. This is accomplished by providing a closure plate 100 across the upper rear edge of section 12 and a similar plate 101 along each side rear edge thereof. These plates extend laterally of the section 12 sufficiently to overlap the margin of the opening 14 in the side wall 15 of the main trailer section as seen in FIGS. 12 and 13. Just forward of the plates 100 and 101 I provide a deflector strip 103 and around the outer top and side edges of section 12 I provide a second weather deflector strip 104. When the trailer section 12 is extended the plates 100 and 101 close the opening 14. Also, I provide a flexible, preferably resilient weatherstrip plate 105 on the forward surface of wall 15 and this extends inwardly of the opening to contact the walls of the section 12. The strips 103 are located inwardly of the member 105 so that any rain or the like which might enter between the edge of the member 105 and the side of the trailer would be deflected and trapped by the strips 103. When the section 12 is retracted the deflectors 104 occupy the positions in which deflectors 103 are shown in FIGS. 12 and 13.

While various types of joints may be employed between the two floor sections 18 and 56 of the trailer, I prefer to bevel or incline the floor sections as best shown in FIG. 7 to provide an inclined butt joint designated 109.

Another feature of my level floor construction is that I may provide air ducts for heating or cooling the section 12 of the trailer and such ducts may be a continuation of supply ducts in the main section 11 of the trailer. Thus, by way of example, I show a main duct 115 (FIGS. 2 and 7) which may lead from a furnace or air conditioner (not shown). This supplies a duct 116 in the floor 56 of section 12, duct 116 being shown as terminating in floor opening having a grill or register 120. If desired, a gasket may be provided at the joint between the ducts 115 and 116.

Although I have illustrated and described a preferred form of my invention, I contemplate that various changes and modifications can be made therein without departing from the invention, the scope of which is indicated by the following claims.

I claim:

1. In a house trailer having a floored main section with an opening in a wall thereof, a telescoping room section movable through said opening, inclined track means mounted externally of said main section and inclined ramp means within said main section on the floor thereof for supporting said telescoping room section for movement into and out of said main section along inclined planes whereby said telescoping room section is elevated when telescoped relative to its extended position, said telescoping room section being mounted to have its outer end portion movably supported on said track means and being mounted to have its inner end portion movably supported on said ramp means, a floor in said telescoping room section adapted to be at the floor level of the main section of the trailer when the telescoping room section is extended, and means supporting said floor in the telescoping room section to permit of the same being raised sufficiently to clear the floor in the main section when the sections are telescoped.

2. In a house trailer having a floored main section with an opening in a wall thereof, inclined track means mounted exteriorly of the main section, ramp means within the main section at the same angle of inclination as said track means, a telescoping room section mounted to have its outer end portion movably supported on said track and mounted to have its inner end portion movably supported on said ramp means for movement through said opening, a floor in said telescoping room section adapted to be at the floor level of the main section of the trailer when the telescoping section is extended, said floor being hingedly mounted at its outer edge along the outer wall of the telescoping room section, and means for raising said floor at its inner edge.

3. The house trailer set forth in claim 2 in which the ramp means within the main section of the trailer comprises removable ramps supported upon the floor of the main section of the trailer.

4. In a house trailer having a floored main section with an opening in a wall thereof, a telescoping room section adapted to move through said opening, said telescoping room section having wheels beneath it at its outer edge, stub track sections mounted on said main section supporting said wheels when said telescoping room section is fully telescoped, an elongated track member detachably mounted on each stub track, means supporting the outer ends of said track members, said track members being inclined in a direction such that the telescoping room section rises as it telescopes into the main section, a floor in said telescoping room section adapted to be at the floor level of the main section of the trailer when the telescoping section is extended, said floor being hingedly mounted at its outer margin along the outer wall of the telescoping room section, and means for adjustably raising said floor at its inner edge.

5. In a house trailer having a floored main section with an opening in a wall thereof, a telescoping room section adapted to move through said opening, said telescoping room section having wheels beneath it at its outer edge, stub track sections mounted on said main section supporting said wheels when said telescoping room section is fully telescoped, an elongated track member detachably mounted on each stub track, means supporting the outer ends of said track members, said track members being inclined in a direction such that the telescoping room section rises as it telescopes into the main section, wheels beneath said telescoping room section adjacent its inner edge, and removable ramp elements on the floor of the main section of the trailer for said last-mentioned wheels.

6. In a house trailer having a floored main section with an opening in a wall thereof, a telescoping room section adapted to move through said opening, said telescoping room section having wheels beneath it at its outer edge, stub track sections mounted on said main section supporting said wheels when said telescoping room section is fully telescoped, an elongated track member detachably mounted on each stub track, means supporting the outer ends of said track members, said track members being inclined in a direction such that the telescoping room section rises as it telescopes into the main section, wheels beneath said telescoping room section adjacent its inner edge, and removable ramp elements on the floor of the main section of the trailer for said last-mentioned wheels, said telescoping room section of the trailer, when extended, having a floor at the same level as the floor of the main section, said floor being hingedly mounted at its outer edge to permit it being inclined for reception in the main section of the trailer.

7. In a house trailer having a floored main section with an opening in a wall thereof, inclined track means mounted exteriorly of the main section, means within the main section forming a ramp at the same angle of inclination as said track means, a telescoping room section mounted to move on said track and ramp means through said opening, a floor in said telescoping room section adapted to be at the floor level of the main section of the trailer when the telescoping section is extended, said floor being hingedly mounted at its outer edge along the outer wall of the telescoping room section, and means for raising said floor at its inner edge, comprising a first threaded member at each inner corner of the floor and a second threaded member supported by said telescoping section above each of said first members and receiving the same, respectively, one of said first and second members being rotatable relative to the other.

8. In a house trailer having a floored main section with an opening in a wall thereof, inclined track means mounted exteriorly of the main section, means within the main section forming a ramp at the same angle of inclination as said track means, a telescoping room section mounted to move on said track and ramp means through said opening, a floor in said telescoping room section adapted to be at the floor level of the main section of the trailer when the telescoping section is extended, said floor being hingedly mounted at its outer edge along the outer wall of the telescoping room section, and means for raising said floor at its inner edge, said means including a removable wheeled beam having a hole freely receiving a hook with a threaded shank, said hook being attachable to the floor, and a nut on said shank above said beam.

References Cited in the file of this patent

UNITED STATES PATENTS

| | | |
|---|---|---|
| 2,147,892 | Gray | Feb. 21, 1939 |
| 2,581,192 | La Fleur | Jan. 1, 1952 |
| 2,606,057 | Johnson | Aug. 5, 1952 |
| 2,757,418 | Bergstrom | Aug. 7, 1956 |
| 2,797,008 | Banker | June 25, 1957 |
| 2,813,747 | Rice | Nov. 19, 1957 |
| 2,820,666 | Grochmal | Jan. 21, 1958 |

FOREIGN PATENTS

| | | |
|---|---|---|
| 971,628 | France | Aug. 2, 1950 |